United States Patent
Black et al.

(10) Patent No.: US 7,852,904 B2
(45) Date of Patent: Dec. 14, 2010

(54) METHOD AND APPARATUS FOR REDUCING DATA COLLISIONS IN A FREQUENCY HOPPING COMMUNICATION SYSTEM

(75) Inventors: Greg R Black, Vernon Hills, IL (US); Christopher N Kurby, Elmhurst, IL (US); Kenneth A Stewart, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 604 days.

(21) Appl. No.: 11/421,245

(22) Filed: May 31, 2006

(65) Prior Publication Data

US 2006/0227852 A1    Oct. 12, 2006

Related U.S. Application Data (62) Division of application No. 10/750,476, filed on Dec. 31, 2003.

(51) Int. Cl.
*H04B 1/00* (2006.01)
(52) U.S. Cl. ............................ 375/133
(58) Field of Classification Search .......... 375/133, 375/132; 370/338, 340, 280, 345, 458, 468
See application file for complete search history.

(56) References Cited

U.S. PATENT DOCUMENTS

| | | | |
|---|---|---|---|
| 5,291,475 A | 3/1994 | Bruckert | |
| 5,987,033 A * | 11/1999 | Boer et al. | 370/445 |
| 6,009,332 A | 12/1999 | Haartsen | |
| 6,028,853 A | 2/2000 | Haartsen | |
| 6,157,699 A | 12/2000 | Dunn | |
| 6,351,643 B1 | 2/2002 | Haartsen | |
| 6,490,446 B1 | 12/2002 | Haartsen | |
| 6,570,857 B1 | 5/2003 | Haartsen et al. | |
| 6,590,928 B1 | 7/2003 | Haartsen | |
| 6,608,821 B1 * | 8/2003 | Gendel | 370/280 |

(Continued)

FOREIGN PATENT DOCUMENTS

CN    1411640 A    4/2003

(Continued)

OTHER PUBLICATIONS

PCT International Search Report, Parent U.S. Appl. No. 10/750,476; dated Jul. 7, 2006; 11 pages.

(Continued)

*Primary Examiner*—Chieh M Fan
*Assistant Examiner*—Jaison Joseph
(74) *Attorney, Agent, or Firm*—Gary J. Cunningham (57) ABSTRACT

A method in a transmitter for data collision avoidance in an uncoordinated frequency hopping communication system is disclosed. The base station (104) first determines (304) that a first data set to be sent to a first device (105) and a second data set to be sent to a second device (107) are scheduled to be transmitted simultaneously on a first frequency of a frequency hop-set. The device then transmits (310) the first data set on the first frequency of the frequency hop-set. The base station delays (312) transmission of the second data set, and finally transmits (316) the second data set on a second frequency of a frequency hop-set.

3 Claims, 6 Drawing Sheets

U.S. PATENT DOCUMENTS

| | | |
|---|---|---|
| 6,757,532 B1 | 6/2004 | Haartsen |
| 7,085,535 B2 | 8/2006 | Goto et al. |
| 2002/0003812 A1 | 1/2002 | Haartsen |
| 2002/0071477 A1 | 6/2002 | Orava |
| 2002/0075941 A1 | 6/2002 | Souissi et al. |
| 2002/0115426 A1 | 8/2002 | Olson et al. |
| 2002/0136183 A1* | 9/2002 | Chen et al. ............... 370/338 |
| 2002/0163933 A1 | 11/2002 | Benveniste |
| 2002/0191677 A1* | 12/2002 | Chen et al. ............... 375/132 |
| 2003/0016651 A1* | 1/2003 | Kwok et al. ............... 370/349 |
| 2005/0069022 A1* | 3/2005 | Agrawal ............... 375/132 |
| 2005/0141562 A1* | 6/2005 | Chen et al. ............... 370/480 |

FOREIGN PATENT DOCUMENTS

| | | |
|---|---|---|
| WO | 0193489 A1 | 6/2001 |
| WO | WO02069571 A2 | 9/2002 |

OTHER PUBLICATIONS

SIPO Office Action; Related U.S. Appl. No. 10/750,476; dated Aug. 8, 2008; 8 pages.

* cited by examiner

METHOD AND APPARATUS FOR REDUCING DATA COLLISIONS IN A FREQUENCY HOPPING COMMUNICATION SYSTEM

FIELD OF THE INVENTION

The present invention relates generally to wireless communications, and more particularly to eliminating data collisions in a frequency hopping communication system.

BACKGROUND OF THE INVENTION

Wireless communication devices generally operate in either licensed RF bands or an unlicensed RF bands. Radiotelephone service providers generally acquire licenses to operate a wireless communication system in one or more of a plurality of licensed RF bands. These systems employ multiple methods to allow multiple access by multiple mobile stations on a common band of frequency channels. One such access technique, frequency division multiple access (FDMA), allows multiple access by assigning the mobile stations to different frequency channels within the RF band. Some of these systems employ frequency hopping, wherein data is transmitted to and from the intended mobile station while periodically changing the frequency channel. The periodic channel frequency hopping occurs on a regular time interval known as a frame. Coordinated frequency hopping systems use predetermined hopping patterns, or hop-sets, wherein the hop-sets are coordinated between all mobile stations to ensure that the signals to and from two or more mobile stations do not occur simultaneously on the same frequency channel. Uncoordinated frequency hopping does not coordinate the hop-set between mobile stations resulting in the periodic occurrence of simultaneous signal transmission on the same frequency. Such simultaneous transmissions are referred to as channel collisions. Data reception errors occurring during a channel collision are referred to as data collisions. Uncoordinated frequency hopping within this type of system is generally not used as the channel collisions and resultant data collisions will occur. The FCC has prohibited coordinated frequency hopping within the Industrial Scientific and Medical (ISM) bands in order to avoid spectrum aggregation by a single type of service.

Systems such as Bluetooth and 802.11 wireless communication systems, for example operate within the ISM bands. To avoid data collisions these systems may monitor the band and choose to operate only in unoccupied sub-bands. These systems may also change sub-bands as the result of the detection of interferer signal strength or the detection of signaling errors indicative of a channel collision with another transmitting station. However channel collisions still occur as devices must sense the interference caused by a channel collision in order to change the frequency sub-band.

Therefore, in order for a GSM system to be compliant with FCC regulations a change to the hopping channel assignment scheme is needed such that the hopping channel assignments are uncoordinated. Therefore, what is needed is a method for the elimination of data collision errors caused by frequency hopping channel collisions in an uncoordinated frequency hopping system.

BRIEF DESCRIPTION OF THE DRAWINGS

The various aspects, features and advantages of the present invention will become more fully apparent to those having ordinary skill in the art upon careful consideration of the following Detailed Description of the Drawings with the accompanying drawings described below.

DETAILED DESCRIPTION OF THE DRAWINGS

A method for the elimination of data collision errors in an uncoordinated frequency hopping communication system is disclosed. The method comprises determining that a first data set, which is to be sent to a first device, and a second data set, which is to be sent to a second device, is scheduled to be transmitted simultaneously on a first frequency, i.e. a channel collision. The data collision is avoided between the two data sets, by transmitting the first data set on the first frequency hopping frequency, while the second data set is delayed, also known as muted. The first data set is thereby transmitted unambiguously and data collisions are avoided in the first device. The final step is transmitting the second data set on a second frequency hopping frequency, sequentially next in the frequency hop pattern at the next frame. The second data set is thereby transmitted unambiguously with a delay of at least one frame. Thus the hopping channels are uncoordinated, since the original uncoordinated hopping sequences are unmodified except for the muting of the transmission to the second device during the channel collision. Data collisions are avoided in the second device during the transmission of the first data set by a determination that the second device is not the intended recipient, and suspension of data reception until another frame.

Due to RF spectrum limitations, an increase in users and the cost of RF spectrum licenses, wireless telecommunications service providers can benefit from using unlicensed RF spectrum to complement the licensed spectrum portion of their systems. Although the spectrum is unlicensed, use-requirements may still apply. One example is the use of unlicensed RF bands to augment GSM radiotelephone services. The GSM system can use coordinated frequency hopping in which each mobile station in a cell uses the same set of channel frequencies and hopping pattern, and a unique time offset of the hopping pattern determined by the mobile allocation index offset (MAIO). In this way the system can accommodate one communication signal for each hopping channel without the occurrence of channel collisions within the same cell.

Figure 1:
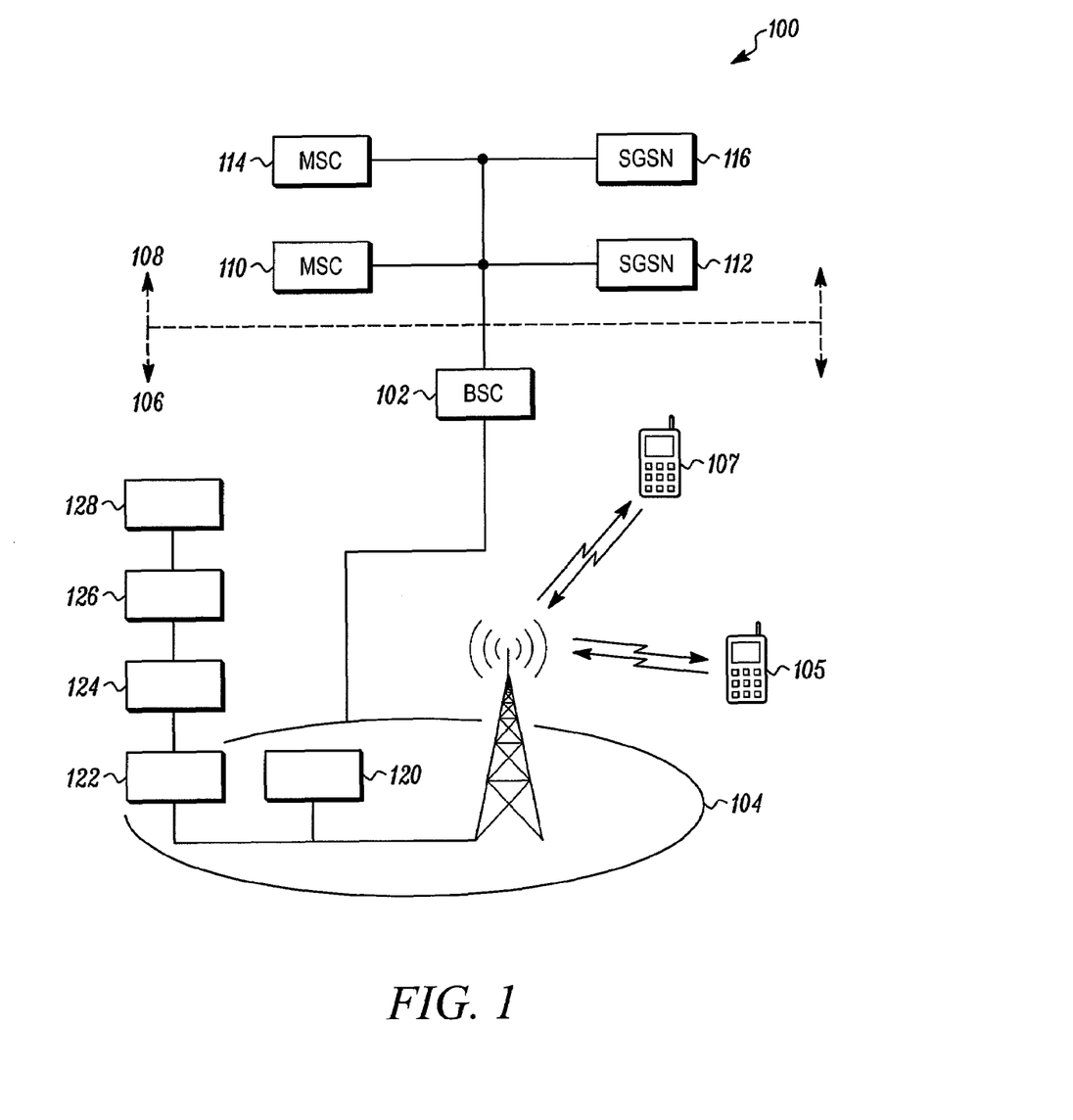
FIG. 1 is an exemplary diagram of a communication system.

FIG. 1 is an exemplary diagram of a wireless communication system 100 according to the present invention. The system 100 includes a base station controller (BSC) 102, also known as a radio network controller (RNC) 102 in some systems, at least one base station 104, and a first wireless device 105, also known as a mobile station (MS) 105, and a second wireless device 107. The BSC 102 and the base stations 104 form the radio access network (RAN) 106 portion of the system which communicates with the wireless devices. A core network, which is coupled to the RAN, includes a mobile switching center (MSC) and may include a serving GPRS support node (SGSN). The core network (CN) 108 portion of the system, illustrated in FIG. 1, includes a first MSC 110 and a first SGSN 112 for a first service provider. The system 100 may also include a second MSC 114 and a second SGSN 116 for a second service provider. In the exemplary embodiment shown in FIG. 1, only two core networks are illustrated but it is understood by one skilled in the art that a plurality of core networks may be coupled to a RAN.

The base station 104 receives messages from the BSC 102 and transmits the messages to the intended wireless devices under an uncoordinated frequency hopping scheme. Communications between the base station 104 and the first wireless device 105 share a first uncoordinated hop-set while the base station 104 and the second wireless device 107 share a second uncoordinated hop-set. There is no coordination between the first uncoordinated hop-set and the second uncoordinated hop-set, however these hop-sets may comprise common frequency channels such that frequency channel collisions may occur. The wireless devices may be mobile stations or other user equipment that communicate with a serving node, such as the exemplary base station 104 of the communication system 100 in FIG. 1. Each wireless device however is coordinated with the base station 104 to necessarily form the communication link between the two. Information represented in the data sets which are to be transmitted to the wireless devices either originate at the BSC 102, or are received at the BSC 102 from the core network 108 to be relayed to the intended wireless device. The information can be either packet-switched data or circuit-switched data and the information may be voice information or data information.

Figure 2:
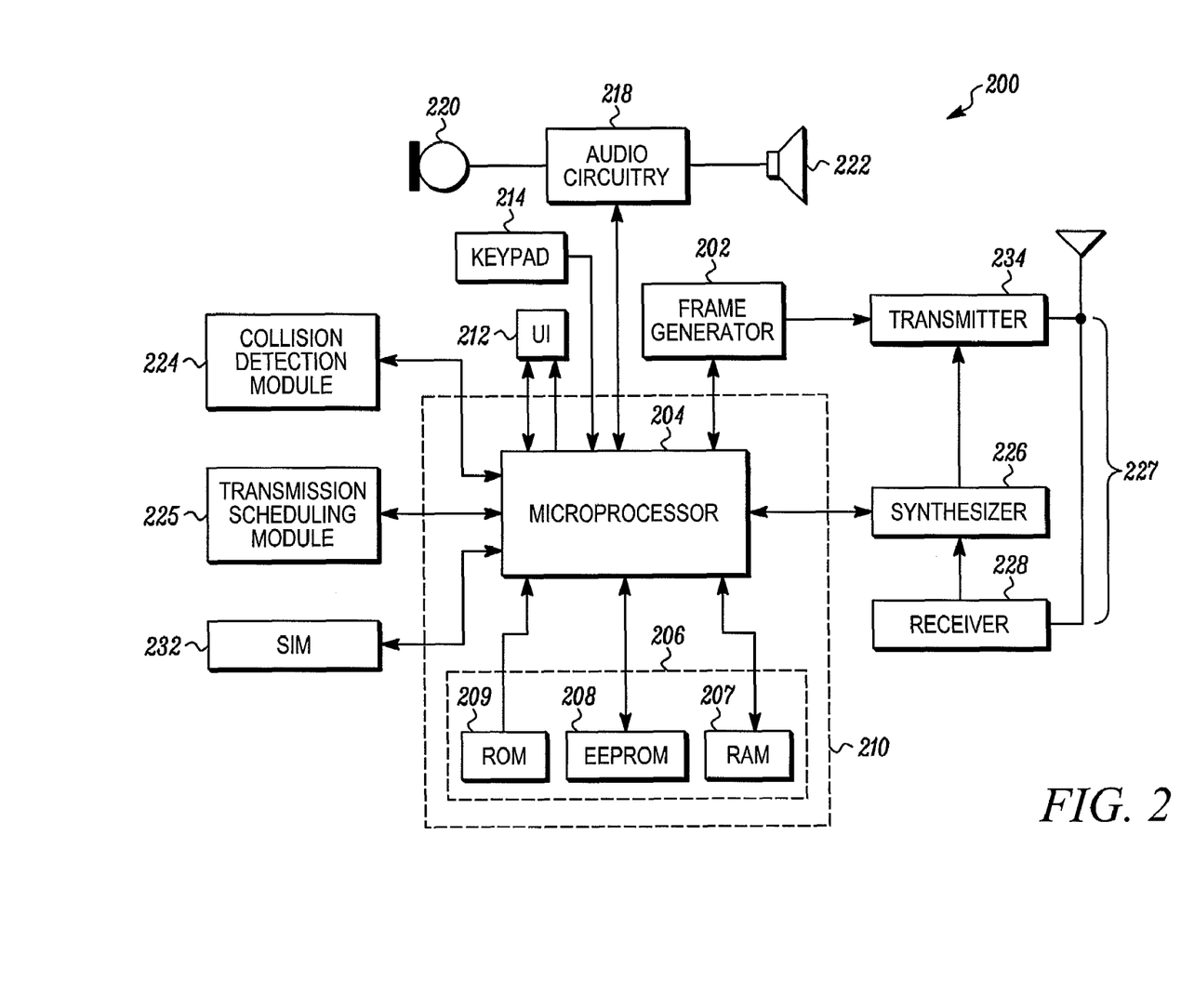
FIG. 2 is an exemplary block diagram of a wireless communication device.

Turning to FIG. 2, a block diagram of a wireless communication device 200 in accordance with one embodiment of the invention is shown. This embodiment can be a cellular radiotelephone incorporating the present invention. However, it is to be understood that the present invention is not limited to this embodiment and may be utilized by other wireless communication devices such as paging devices, personal digital assistants, portable computing devices, and the like, having wireless communication capabilities. In this embodiment a frame generator 202 and a microprocessor 204, combine to generate the necessary communication protocol for operating in a wireless communication system. Microprocessor 204 uses memory 206 comprising RAM 207, EEPROM 208, and ROM 209, which can be consolidated in one package 210, to execute the steps necessary to generate the protocol and to perform other functions for the wireless communication device, such as writing to a display 212, accepting information from a keypad 214, or controlling a frequency synthesizer 226 to attune the device to the appropriate frequency in a frequency hopping pattern. The memory may also include a SIM card 232. In situations where the wireless device is used for voice transmissions, the frame generator 202 processes audio transformed by audio circuitry 218 from a microphone 220 and to a speaker 222.

FIG. 2 also shows at least one transceiver 227 comprising receiver circuitry 228, that is capable of receiving RF signals from at least one bandwidth and optionally more bandwidths. The receiver 228 may optionally comprise a first receiver and a second receiver, or one receiver capable of receiving in two or more bandwidths. The receiver 228, depending on the mode of operation, may be tuned to receive PLMRS, AMPS, GSM, EGPRS, CDMA, UMTS, WCDMA, Bluetooth, or WLAN, such as 802.11 communication signals for example. The transceiver 227 includes at least one transmitter 234. The at least one transmitter 234 may be capable of transmitting to one device or base station in one frequency band and potentially on multiple frequency bands. As with the receiver 228, dual transmitters 234 may optionally be employed where one transmitter is for the transmission to a proximate device or direct link establishment to WLAN's and the other transmitter is for transmission to the base station 108.

The wireless communication device 200, which can be adapted to communicate in a frequency hopping wireless communication, may also comprise a channel collision detection module 224 that detects when received messages are not intended to be received by the mobile station 200 and a transmission scheduling module 225 both coupled to the microprocessor 204.

A base station 104 of the wireless communication system can include a transmitter 120 and a receiver 122 for communicating with a plurality of wireless communication devices. The base station 104 can also include a message reception module 124, that receives messages from the core network which are to be transmitted to one of a plurality of wireless communication devices. The base station may also include a frequency hop pattern generation module 126. The frequency hop pattern generation module 126 determines the frequency hop-set pattern for each device of the plurality of devices. The frequency hop-set patterns are uncoordinated from device to device. The base station 104 can also include a channel collision detection module 128 that detects when received messages are scheduled to be transmitted on the same frequency at the same time and a message scheduling module that reschedules or delays transmission of a data set that was determined to collide with another data set.

Figure 3:
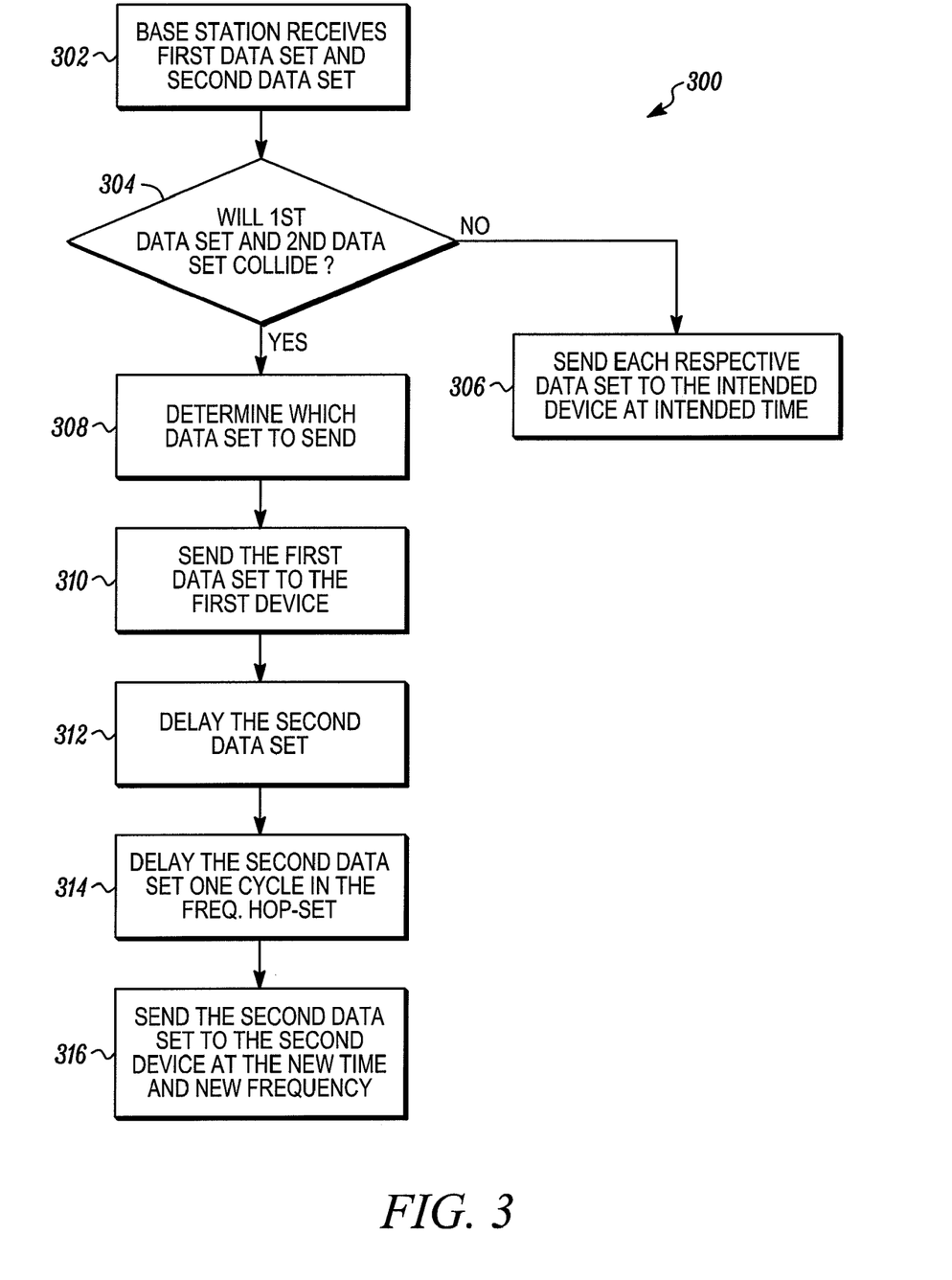
FIG. 3 is an exemplary flow diagram of a data transmission method.

FIG. 3 shows an exemplary flow diagram 300 illustrating how a first data set is received 302 at the base station 104 for transmission to the intended mobile station. The intended mobile station can be the first wireless device 105 in this exemplary embodiment. In step 302, the first data set is received at a first time on a first frequency of a first uncoordinated frequency hop-set. Similarly, a second data set is also received at the base station 104 for transmission to the intended mobile station, the second mobile station 107 in this exemplary embodiment. The first data set and the second data set do not necessarily arrive at the base station 104 at the same time. It is envisioned that they can in fact be received independently. The second data set can be also scheduled to be sent at the first time on the first frequency of a second uncoordinated frequency hop-set. The base station 104 can determine in step 304 that a data collision will occur as both the first and the second data set are scheduled to be transmitted on the same frequency at the same time. In step 308, the base station 104 can determine which data set to send first or at all. In step 310, the first data set is then transmitted to the first wireless device 105 in this exemplary embodiment. This provides for an unambiguous transmission to the first wireless device 105. In step 312, the second data set is delayed, or muted and not transmitted at the scheduled time or on the scheduled frequency. If the second data set is to be delayed, in step 314, the second data set may be delayed one cycle in the frequency hop-set. In step 316, the second data set can then be sent to the second device at the delayed time on the next frequency. If in step 304 the base station 104 determines that a collision will not occur, the base station 104 transmits, in step 306, both data sets as scheduled in accordance with each respective hop-set. The second data set may also be discarded instead of transmitted.

Although two data sets are used for exemplary purposes throughout this disclosure, it is envisioned that a plurality of data sets may be scheduled to be transmitted simultaneously and on the same frequency as the individual frequency hop-sets associated with each device are uncoordinated between the devices. As the number of wireless devices communicating in the communication system increases, the potential for data collisions also increases. Therefore the base station 104 must check the scheduling of all messages to be transmitted, in accordance with the above method, to avoid collisions.

Figure 4:
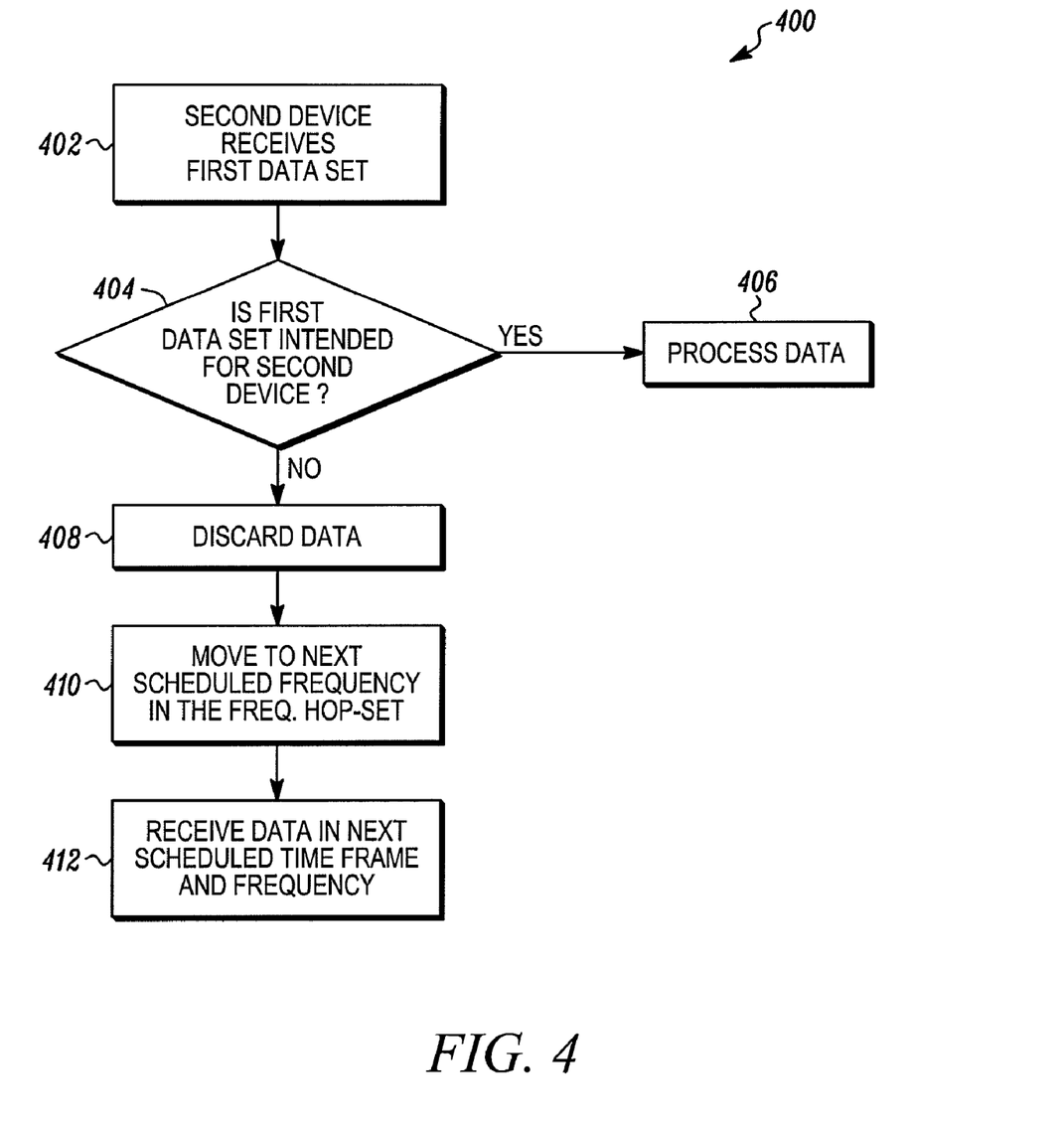
FIG. 4 is an exemplary flow diagram of a data reception method.

FIG. 4 is an exemplary flowchart 400 outlining the operation of a wireless device according to an exemplary embodiment. For example, the second wireless device 107 can be the intended recipient of the second data set from the base station 104. As the base station 104 has delayed 312 the transmission of the second data set, the second device 107 can receive 402 the first data set during the scheduled time the second device 107 is supposed to receive the second data set. If, step 404, the second wireless device 107 determines the first data set is actually intended for the second wireless device 107, in step 406, the second wireless device 107 processes the data. If in step 404, the second wireless device 107 determines that it is not the intended recipient for the data transmitted by the base station, i.e. the first data set, the first data set is discarded 408 or reception is suspended.

Continuing with reference to FIG. 4, the second device 107 can then tune 410 to the next scheduled frequency in the hop pattern allowing that device to receive 412 the second data set at the next frequency, at the next scheduled frame. The next frequency in the hopping pattern is the next scheduled frequency in the hop-set, such that the hopping pattern resumes at the next scheduled frame. In this way the two hopping patterns, a first hopping pattern for the first device 105 and a second hopping pattern for the second device 107, are uncoordinated hopping patterns since the hopping patterns are unaltered after the occurrence of a channel collision.

The base station 104 should determine which data set should be transmitted after determining 304 that a channel collision will occur. In one exemplary embodiment, the base station 104 or the base station controller 102 can send the data set received first in time at the base station 104 or the base station controller 102. In this exemplary embodiment, the data sets are processed on a first in first out (FIFO) basis. In another exemplary embodiment, the data set to be sent first is randomly selected. If multiple data sets are scheduled to collide, all except one data set would have to be rescheduled. It should be noted that multiple transmissions can occur at the same time. However, multiple transmissions can not occur at the same time on the same frequency without causing data collisions and resultant data errors in the wireless device receivers. In another embodiment, priority is given according to the radiated power at the base station 104. A higher priority is assigned for example to a device that requires higher radiated power at the base station 104. It may also be the case that the higher priority is assigned to a device that requires lower radiated power at the base station 104. In yet another embodiment, priority is given according to the needs of the wireless device, whereby voice data may be given higher priority than other types of data, for example. It is understood by one skilled in the art that there are a plurality of methods for determining which data set to send and in what order, and the disclosure is not limited to those exemplary embodiments listed herein.

Figure 5:
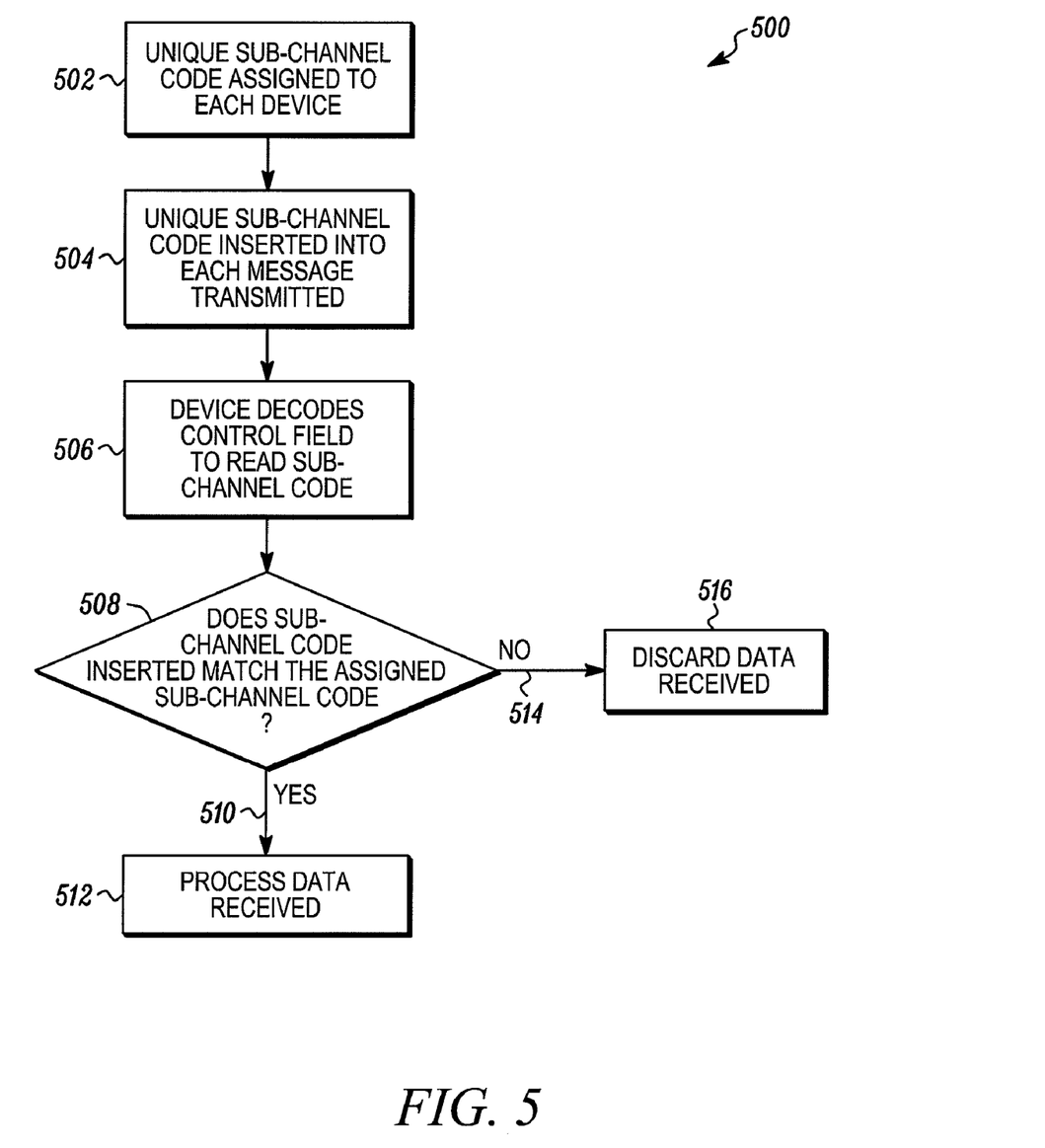
FIG. 5 is an exemplary flow diagram of a data reception method.

FIG. 5 is an exemplary flowchart outlining a method 500 for determining that the data is not intended to be received by either of the exemplary first wireless device 105 or the second wireless device 107. For example, this process may be used in step 404 of the flowchart 400. In this embodiment, a unique sub-channel code can be assigned 502 to each wireless device using the hop-set. The unique sub-channel code can be inserted 504 into each transmission. In this exemplary embodiment, the unique sub-channel code can be included in a control field in the received data set. The unique sub-channel code allows each device to determine which data set, the first data set or the second data set in the exemplary embodiment, is intended to be received by the respective device. The wireless device 105, 107 can then decode 506 the control field upon reception of the data set and determine 508 if the unique sub-channel code in the received data set matches the unique sub-channel code assigned to the wireless device by the base station 104. If the unique sub-channel code matches 510, then device processes 512 the data. If the unique sub-channel code does not match 514, the data set is discarded 516.

For example, in an exemplary GSM system, a GSM traffic channel (TCH) might be modified to include a temporary mobile station identity code (TMSIC), which is the unique sub-channel code having a unique value for every wireless device receiving a data set, i.e. data transmissions, from the base station on a particular hop-set of hopping frequencies channels. Upon decoding the TMSIC the second mobile station will determine that the received TMSIC is different that its TMSIC assignment and discard the received data or suspend reception.

Figure 6:
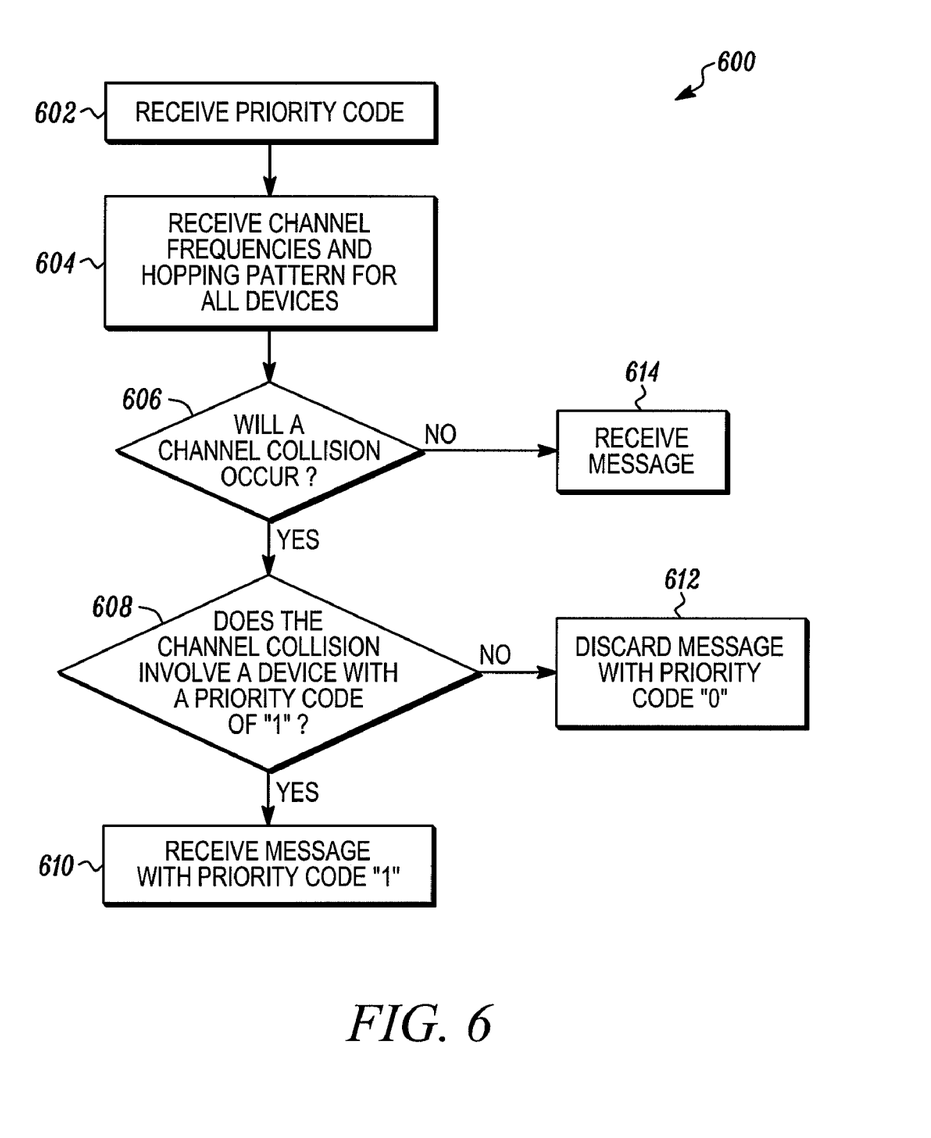
FIG. 6 is an exemplary flow diagram of a data transmission method.

Referring to FIG. 6, in another exemplary embodiment flowchart 600, the wireless devices, such as the first and second wireless devices 105, 107, receive 602, from the base station 104, a unique priority code which is assigned to each wireless device using the hop-set of frequency hopping channels. The wireless devices, 105, 107 then receive 604 from the base station 104 the channel frequencies and hopping patterns of all wireless devices using a hop-set. The received frequencies and hopping patterns are used by the wireless devices 105, 107 to predict or determine when channel collisions will occur. For example when the first wireless device 105 detects 606 a channel collision, the first device 105 can use a predetermined rule set to determine 608 the intended recipient of the information transmitted by the base station 104. The predetermined rule set assures that only one recipient is assigned during a channel collision.

In one exemplary embodiment of this approach, the first wireless device 105 is assigned a device priority of "1", and a device priority of "0" is assigned to all other wireless devices using the hop-set. The first device 105 will receive 610 the first message which has the higher priority code. The first device will discard 612 any message with a "0" priority. If there will not be a channel collision, the message is processed 614. In this embodiment, multiple devices can be given the priority of "1" and when a channel collision is detected, the rule set determines which device with the "1" priority to receive the data set, with all other data set transmissions being delayed until the next scheduled frame. In another exemplary embodiment the device priority might automatically change according to predetermined rules after each channel collision, such that the mobile stations alternate using the channel during channel collisions. Upon determining that a channel collision will occur and that the transmitted data set is intended for a different wireless device, the second mobile station suspends reception. The priority of "1" and "0" are exemplary values and the values may be integrated over a range of values for example.

Complimentary to the mobile station operation, after the base station detects that the channel collision will occur; the base station must determine if the channel collision involves data being sent to at least one device with a higher priority code. The base station will determine if a first message has a priority code higher than a second message. In this exemplary embodiment, only the first wireless device with the priority of "1" will receive the transmission of the first message when a channel collision occurs. The base station will send the first message which has the higher priority code and delay the message or messages with the lower priority code.

In the above exemplary embodiments, the methods allow for the avoidance of data collisions in the downlink transmissions from base station to mobile station, i.e. wireless device. Analogous techniques may be applied for avoiding data collisions on the uplink transmissions, i.e. transmissions between mobile stations and the base station. This applies to the situation in which the uplink and down-link hop sets are uncoordinated. However it is anticipated that coordination of up-link and down-link hop-sets will be allowed. In the cases such where the downlink and uplink channels are assigned in pairs, one exemplary embodiment provides a method where the uplink channel assignment follows the downlink assignment on the same frequency channels. In another exemplary embodiment, such as in the GSM case, the uplink channel follows the downlink channel with a fixed frequency offset. According to this approach, whenever a downlink channel collision occurs there will necessarily be a corresponding uplink collision. Thus, in this exemplary embodiment, when a wireless device receives a downlink data set during a channel collision as in accordance with one of the approaches described above, it will then transmit its uplink data set on the scheduled uplink transmission period, whereas if a wireless device does not receive a data set during a channel collision it will refrain from transmitting its data set on the scheduled uplink period, and wait until the next scheduled uplink period to transmit the data set on the next channel frequency in the hop-set, thereby avoiding an uplink data collision.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a wireless communication device to eliminate data collisions wherein transmissions are made in an uncoordinated frequency hopping scheme such that the downlink channels and uplink channels are assigned in pairs, and wherein the uplink channel assignment follows the downlink assignment and uplink channel collisions occur following downlink channel collisions, said method comprising:
   determining that a downlink channel collision has occurred including determining that a downlink data set received by the device was not intended to be received by the device;
   refraining from transmitting an uplink data set during the scheduled uplink period; and
   transmitting the uplink data set on the next scheduled uplink period thereby avoiding an uplink channel collision.

2. The method according to claim 1, wherein determining that a downlink channel collision has occurred further comprises determining that a sub-channel code included in the downlink data set received by the device does not match an assigned sub-channel code.

3. The method according to claim 2, wherein determining that a downlink channel collision has occurred further comprises determining that a priority code does not match an assigned priority code.

* * * * *